(12) United States Patent
Griggs

(10) Patent No.: US 8,215,899 B2
(45) Date of Patent: Jul. 10, 2012

(54) VERTICALLY ROTATABLE SHAFT ASSEMBLY WITH THERMALLY INSULATED HOUSING

(76) Inventor: Paul E Griggs, Denham Springs, LA (US)

(*) Notice: Subject to any disclaimer, the term of this patent is extended or adjusted under 35 U.S.C. 154(b) by 7 days.

(21) Appl. No.: 12/881,339

(22) Filed: Sep. 14, 2010

(65) Prior Publication Data

US 2011/0064346 A1    Mar. 17, 2011

Related U.S. Application Data

(60) Provisional application No. 61/242,538, filed on Sep. 15, 2009.

(51) Int. Cl.
*F01D 25/16* (2006.01)
(52) U.S. Cl. .......... 415/112; 415/229
(58) Field of Classification Search .......... 415/206, 415/229, 112, 109; 416/175, 198 R, 198 A, 416/203; 417/373, 423.3, 423.11–423.13, 417/424.1
See application file for complete search history.

(56) References Cited

U.S. PATENT DOCUMENTS

| | | | | |
|---|---|---|---|---|
| 2,913,988 | A * | 11/1959 | White | 417/357 |
| 3,048,118 | A * | 8/1962 | Erd | 415/168.2 |
| 3,255,702 | A * | 6/1966 | Gehrm | 415/197 |
| 4,073,596 | A | 2/1978 | Erickson et al. | |
| 4,126,406 | A * | 11/1978 | Traylor et al. | 417/373 |
| 5,571,001 | A * | 11/1996 | Fukuda et al. | 417/423.3 |
| 6,030,128 | A | 2/2000 | Pontzer | |
| 6,354,796 | B1 * | 3/2002 | Morando | 415/121.2 |
| 6,379,127 | B1 * | 4/2002 | Andrews et al. | 417/423.11 |
| 6,655,930 | B2 * | 12/2003 | Sato et al. | 417/373 |
| 6,737,613 | B2 | 5/2004 | Yamaguchi et al. | |
| 6,759,774 | B1 * | 7/2004 | Griggs | 310/87 |
| 7,338,252 | B2 | 3/2008 | Meuter | |
| 2004/0130042 | A1 | 7/2004 | Blakely et al. | |
| 2009/0095793 | A1 | 4/2009 | Tombs et al. | |

OTHER PUBLICATIONS

PCT Search Report and Written Opinion for PCT Application No. PCT/US2010/048730, Jun. 16, 2011, 8 pages.

* cited by examiner

*Primary Examiner* — Edward Look
*Assistant Examiner* — Andrew C Knopp
(74) *Attorney, Agent, or Firm* — Maine Cernota & Rardin

(57) ABSTRACT

A vertically mountable shaft and bearing assembly includes a thermally insulated housing which protects the shaft, bearing(s), seal(s), and bearing lubricant from overheating due to a surrounding process fluid at a temperature exceeding 65° C. The thermal insulation, which in some embodiments includes vacuum, air, or an insulating material, enables a rolling element bearing to be located near the shaft's distal end, thereby reducing shaft and bearing size requirements. Lubricant is circulated past the bearing(s) by a circulation and cooling system having a capacity typical of systems used with process fluids at much lower temperatures. Additional roller and/or journal bearings can be included. The lubricant circulation system can be actuated by the shaft or driven separately. Lubricant within the shaft housing can be pressurized, for example by pressurizing gas or by filling the lubricant above the surrounding process fluid level. The shaft can operate a process fluid pump impeller.

22 Claims, 5 Drawing Sheets

VERTICALLY ROTATABLE SHAFT ASSEMBLY WITH THERMALLY INSULATED HOUSING

RELATED APPLICATIONS

This application claims the benefit of U.S. Provisional Application No. 61/242,538, filed Sep. 15, 2009, and incorporated herein by reference in its entirety for all purposes.

FIELD OF THE INVENTION

The invention relates to mechanically rotatable mechanisms, and more particularly to mechanisms for imparting rotation to shaft-driven machines immersed in toxic, environmentally sensitive, and/or volatile fluids at elevated temperatures.

BACKGROUND OF THE INVENTION

Many industrial processes involve the conveyance of process fluid streams by pumps, mixers and other submerged or partially submerged shaft-driven machines. Often these shaft-driven machines must be immersed in chemicals which are so toxic, environmentally sensitive, and/or volatile that vertical tank-mounted mechanisms are preferred so as to preclude the need for submerged tank penetrations that could be sources of uncontrolled process fluid leakage to the environment in the event of connection failures. Additionally, many of these process fluids, because of entrained solids and/or corrosives, are not suitable bearing lubricants, thereby requiring that any bearings that are submerged in the process fluid must be isolated from the process fluid and lubricated by a separate bearing lubricant.

With reference to FIG. 1A, one approach is to mount a motor 1 or other rotation-imparting mechanism on the top 4 of a tank containing the toxic, environmentally sensitive, and/or volatile fluid 3, and allow a shaft 5 to extend vertically downward therefrom into the fluid 3. A housing 14 containing at least one seal 10 and at least one bearing 12 can be extended into the fluid so as to support the shaft 5 near its distal end while protecting the bearing 12 from the fluid 3. An appropriate lubricant 100 can be supplied to the bearing 12 within the housing 5, for example by filling the housing 14 with the lubricant 100 as shown in FIG. 1A.

However, some processes involve process fluids at elevated temperatures exceeding 65° C., creating a substantial limitation to the use of standard, commercially available rolling element bearings 12, due to the likelihood that the combination of load generated heat with heat transferred from the surrounding process fluid will cause the temperature of the bearing 12 to exceed the bearing manufacturer's maximum temperature limitation.

With reference to FIG. 1B, one approach to preventing heat damage to the seals 10 and bearings 12 is to use an integral oil circulation system to remove bearing and seal generated heat by circulating the lubricant 100 to an external reservoir (not shown) for cooling and storage. However, for high temperature processes with process fluids at temperatures above 65° C., very large and costly lubrication systems are required so as to remove the heat at a sufficient rate. Also, removal of heat at the high rate necessary to protect the bearings 12 and mechanical seals 10 may tend to cool the surrounding process fluid and thereby interfere with maintaining a desired temperature within the process.

With reference to FIG. 1C, another approach is to locate all seals 10 and bearings 12 outside of the tank 4, thereby isolating them from the elevated temperature of the process fluid. However, modern mechanical seals 10 require that the shaft 5 be mechanically stable so as to ensure proper operation of the seal. It is well known to those skilled in the art that to provide a suitable shaft stability for a mechanical seal 10, it is desirable to have a shaft $L^3/D^4$ ratio of less than 50, where L is defined as the overhung shaft length in inches between the axial centerline of the bearing 12 closest to the impeller 25 (inboard bearing) and the axial centerline of the impeller, and D is defined as the diameter in inches of the smallest cross section of the shaft 5 within length L, exclusive of the impeller mounting surface. Note that throughout this document values for $L^3/D^4$ are expressed in units of $in^{-1}$.

The larger the $L^3/D^4$ ratio, the more shaft deflection is likely to occur. Such shaft deflection may be generated by any unexpected operating conditions, such as pump cavitations, closed suction or discharge valves, or improper operating conditions (i.e. improper pump selection). The greater the shaft deflection, the greater the wear on the seals 10 and bearings 12 in the system.

Therefore, the most cost effective method to provide the required shaft stability for a mechanical seal 10 and bearing 12 located outside of the tank 4 is to use a rolling element bearing 12 paired with a shaft having $L^3/D^4$ of less than 50, so as to prevent the shaft deflection at the mechanical seal 10 from exceeding the manufacture's recommendations. One common approach is to employ what is known to those familiar in the art as a cantilever shaft 5. A cantilever shaft pump or mixer uses a shaft 5 with a sufficiently large diameter so as to allow the bearings 12 to be mounted external to the tank with the impeller 25 mounted on the distal end of a shaft section that is cantilevered downward from the support bearings 12 into the tank 4. Packing or mechanical shaft seals 10 are mounted at the cover plate 4 so as to prevent leakage. A cantilevered pump or mixer has the advantage of being able to handle toxic, environmentally sensitive, and/or volatile fluids, with or without suspended solids, at elevated temperatures, without the use of any bearing supports below the tank mounting plate.

However, a disadvantage the cantilever designs is that the bearings 12 and shaft 5 need to be quite large in diameter so as to adequately support the cantilevered mass under load without vibration or excessive movement. These large sizes result in extra cost, and often restrict the ready replacement availability of bearings 12 and seals 10, which can be quite costly and complex due to the toxicity, environmental sensitivity, and/or volatility of the process. The large shaft sizes and bearing sizes typical of the cantilever approach also limit the equipment operation to lower operating speeds than would be available with smaller diameter bearings 12 and mechanical seals 10, due to reduced maximum speed limits inherent to larger diameter bearings 12 and seals 10.

Yet another approach is to use pumps and mixers driven by submersible motors that are capable of handling toxic, environmentally sensitive, and/or volatile fluids, including fluids that may contain solids. These units use oil-lubricated or grease-lubricated rolling element bearings in cooperation with suitable mechanical seals to isolate the bearings from the process fluid. However, this approach suffers from several disadvantages. Submersible motor-driven pumps and mixers, because of electrical losses, have substantially greater heat removal requirements than mechanisms that immerse only bearings and seals in the process fluid. Also, the repair or replacement of a submersible motor is more costly, more frequently required, and more time consuming than the repair or replacement of a standard electric motor which is externally mounted. In addition, many process fluids contain chemicals that are problematic to the integrity of insulation on submerged electrical cables, which can limit the application of submersible motor-driven pumps as compared to pumps with externally mounted motors.

Therefore, there exists a need for a vertical, tank-mounted shaft and bearing mechanism that can be driven by an externally mounted electric motor or other rotation-imparting device, wherein a load driven by the distal end of the shaft is capable of operating submerged at temperatures exceeding 65° C. in a volatile, environmentally sensitive, and/or toxic process fluid which may include entrained solids, wherein the mechanism includes mechanical seal(s) which are paired with the shaft with an $L^3/D^4$ of less than 50 to prevent excessive deflection of the shaft at the mechanical seal(s), wherein the bearing(s) and seal(s) are of standard sizes and thereby less costly than those used with cantilevered shaft units, and wherein the lubrication cooling system need not be substantially oversized due to a need to protect the bearing(s) and seal(s) from an excessive heat load due to the surrounding process fluid.

SUMMARY OF THE INVENTION

The present invention is a shaft and bearing assembly which includes a housing that is thermally insulated. The thermal insulation of the bearing and shaft housing protects the bearing(s), seal(s), and bearing lubrication from overheating due to submergence in a process fluid which is at a temperature that exceeds 65° C. In some of these embodiments, the thermal insulation includes vacuum insulation. In other embodiments, the thermal insulation includes an insulation filled jacket, and in still other embodiments the thermal insulation includes a gas or air-filled jacket.

In embodiments, the shaft and bearing assembly is vertically mountable. The thermal insulation of the bearing and shaft housing enables at least one mechanical bearing to support the shaft near its distal end, thereby reducing $L^3/D^4$, and consequently reducing the size requirements for the shaft and mechanical bearing.

In some embodiments, lubricant is circulated past the bearing(s) within the insulated housing by a circulation system having a circulating and cooling capacity typical of lubricant circulation systems used with assemblies submerged in process fluids at much lower temperatures. In various of these embodiments, the lubricant circulation pump can be located either within the bearing and shaft housing or external to the bearing and shaft housing and external to the process tank, and it can be driven by the shaft within the oil reservoir or it can be independently driven.

In some of these embodiments, the assembly of the thermally insulated bearing and shaft housing and the sealed shaft serves as a lubricant reservoir for the lubricant circulation system. In certain of these embodiments, the lubricant reservoir is pressurized from an external source to a pressure higher than the process pressure, so as to avoid any leakage of process fluid past the lower seal(s) and into the bearing and shaft housing. And in some of these embodiments, the positive lubrication pressure differential is maintained on the lower seal(s) by an elevated lubricant level in the sealed bearing and shaft housing relative to the height of the process fluid level in the process tank.

Some embodiments of the present invention include a vertically tank-mountable pump assembly having a portion of a lower (distal) end of the pump assembly that is immersible in a process fluid which is at an elevated temperature exceeding 65° C., and which may or may not contain entrained solids. In some of these embodiments, the lower end of the pump assembly includes one or more impellers coaxially mounted on the distal end of the vertical shaft and rotatably supported by rolling element bearings located near the impeller(s). In these embodiments the impeller(s) are vertically suspended by the pump shaft within casing(s) which channel the pumped fluid from a pump inlet to a pump outlet, and the casing(s) are suspended from a seal housing and a double-walled or jacketed shaft and bearing housing assembly which extends coaxially downward from the pump mounting plate.

In some of these embodiments, the bearing(s) are coaxially located inboard and proximate to mechanical seals located adjacent to the uppermost impeller and the pump mounting plate, such that the mechanical seals are suitably supported and the bearing(s) and the interior of the bearing housing are isolated from both the process fluid and the ambient atmosphere. The mechanical seals can be either single or multiple seal arrangements, depending on the desired sealing redundancy.

In various embodiments the shaft assembly can incorporate a plurality of bearings which can be either rolling element bearings or journal bearings. The sealed bearing and shaft housing can incorporate a plurality of vacuum-jacketed bearing housings assembled in series, in combination with additional journal bearings.

One general aspect of the present invention is a vertically mountable shaft and bearing assembly for imparting rotary motion to a rotatable device submerged in a process fluid at a high temperature. The assembly includes a shaft having a proximal end to which rotation can be imparted and a distal end which is at least attachable to the rotatable device, a lower mechanical bearing configured so as to rotatably support the shaft near its distal end, a shaft housing having an interior which contains the lower mechanical bearing and at least a portion of the shaft proximal to the lower mechanical bearing, the shaft housing including thermal insulation which is capable of inhibiting conduction of heat from process fluid surrounding an exterior of the shaft housing into the interior of the shaft housing, and a lower mechanical seal configured so as to allow the distal end of the shaft to rotatably extend beyond a distal end of the shaft housing while inhibiting entry by the process fluid into the interior of the shaft housing when the distal end of the shaft housing is submerged in the process fluid.

In some embodiments, the thermal insulation includes an evacuated space between inner and outer walls of the shaft housing. In other embodiments the thermal insulation includes a layer of thermally insulating material. In still other embodiments, the thermal insulation includes a space between inner and outer walls of the shaft housing which is filled with a gas such as air.

In various embodiments the shaft housing and lower mechanical seal form a lubrication reservoir which is able to contain a lubricant that lubricates the lower mechanical bearing. In some of these embodiments the lubrication reservoir is configured so as to be filled with lubricant to a level higher than a level of surrounding process fluid when the distal end of the shaft housing is submerged in the process fluid.

Certain embodiments further include a lubricant circulation system configured so as to deliver lubricant to the lower mechanical bearing and then remove it therefrom. Some of these embodiments further include a lubricant cooler configured so as to cool the lubricant after it is removed from the lower mechanical bearing and before it is returned thereto. In other of these embodiments the lubricant circulation system is actuated by rotation of the shaft. And in some of these embodiments the lubricant circulation system includes an impeller attached to the shaft and submerged within a lubrication reservoir formed by the shaft housing and the lower mechanical seal.

Various embodiments further include an upper mechanical bearing configured so as to support the shaft near its proximal end. Some of these embodiments further include an upper mechanical seal configured so as to isolate the interior of the shaft housing from a surrounding environment. In other of these embodiments the upper mechanical seal is lubricated by a gas. Still other of these embodiments further include a lubricant circulation system configured so as to deliver lubricant to the upper mechanical bearing and to the lower mechanical bearing, and to remove it therefrom. In yet other of these embodiments the upper mechanical seal includes a plurality of seals. In certain other of these embodiments the upper mechanical bearing is an oil-lubricated, roller element bearing. Various other of these embodiments further include at least one intermediate bearing configured so as to support the shaft at a location between the lower mechanical bearing and the upper mechanical bearing, each of the intermediate bearings being one of a journal bearing and a roller element bearing. And in some of these embodiments the interior of the shaft housing can be pressurized by a gas to a pressure greater than a pressure of process fluid adjacent to the lower mechanical seal when the distal end of the shaft housing is submerged in the process fluid.

In various embodiments the lower mechanical seal includes a plurality of seals. In other embodiments the lower mechanical bearing is an oil-lubricated, roller element bearing. In certain embodiments the shaft has an $L^3/D^4$ of less than 50 in$^{-1}$. In other embodiments the rotatable device is an impeller included in a fluid pump. And in still other embodiments the shaft housing is configured so as to support a housing of a fluid pump.

Another general aspect of the present invention is a vertically mountable shaft and bearing assembly for imparting rotary motion to a rotatable device submerged in a process fluid at high temperature. The assembly includes a shaft having a proximal end to which rotation can be imparted, and a distal end which is at least attachable to the rotatable device, an upper mechanical bearing configured so as to support the shaft near its proximal end, and a lower mechanical bearing configured so as to support the shaft near its distal end.

The assembly further includes a shaft housing having an interior which contains the lower mechanical bearing and a portion of the shaft proximal to the lower mechanical bearing, the shaft housing including thermal insulation which is capable of inhibiting conduction of heat into the interior of the shaft housing, an upper seal configured so as to allow the proximal end of the shaft to rotatably extend beyond a proximal end of the shaft housing while isolating the shaft housing interior from a surrounding environment, a lower mechanical seal configured so as to allow the distal end of the shaft to rotatably extend beyond a distal end of the shaft housing while inhibiting entry of process fluid into the interior of the shaft housing when the distal end of the shaft housing is submerged in the process fluid, and a lubricant circulation system which is capable of circulating lubricant between the upper mechanical bearing, a lubricant reservoir within the shaft housing interior, the lower mechanical bearing, and a lubricant cooler external to the shaft housing.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a shaft and bearing assembly which includes a housing that is thermally insulated. The thermal insulation of the bearing and shaft housing protects the bearing(s), seal(s), and bearing lubrication from overheating due to submergence in a process fluid which is at a temperature that exceeds 65° C. In some of these embodiments, the thermal insulation includes vacuum insulation. In other embodiments, the thermal insulation includes an insulation filled jacket, and in still other embodiments the thermal insulation includes a gas or air-filled jacket.

In various embodiments, the shaft and bearing assembly is vertically mountable. The thermal insulation of the bearing and shaft housing enables at least one mechanical bearing to support the shaft near its distal end, thereby reducing $L^3/D^4$, and consequently reducing the size requirements for the shaft and mechanical bearing. In some embodiments, lubricant is circulated past the bearing(s) within the insulated housing by a circulation system having a circulating and cooling capacity typical of lubricant circulation systems used with assemblies submerged in process fluids at much lower temperatures.

Figure 1A:
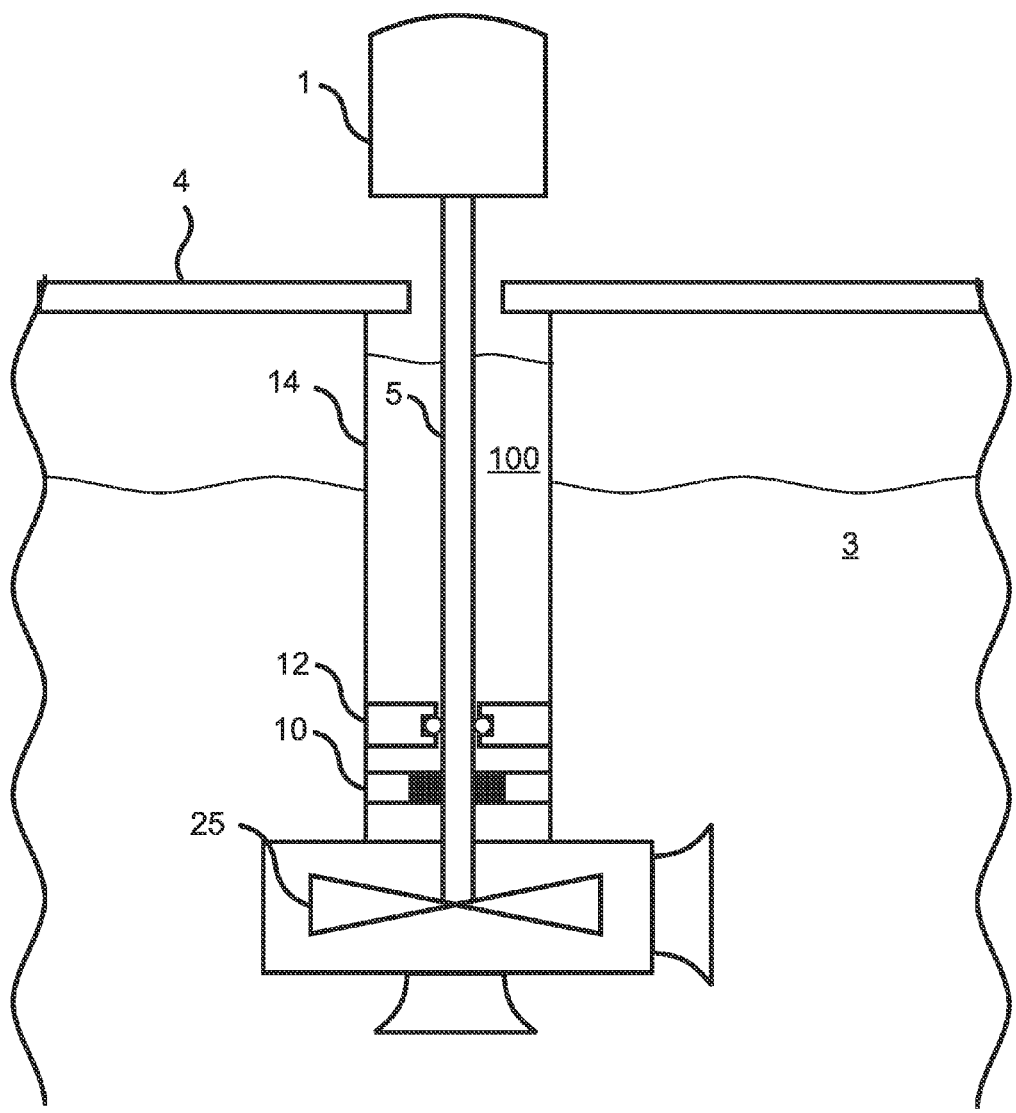
FIG. 1A is a cross-sectional side view of a typical prior art vertical, tank-mounted shaft and bearing assembly which includes a bearing located near the proximal end of the shaft, the bearing being lubricated by lubricant in a reservoir formed by a surrounding shaft housing and mechanical seal.
Figure 1B:
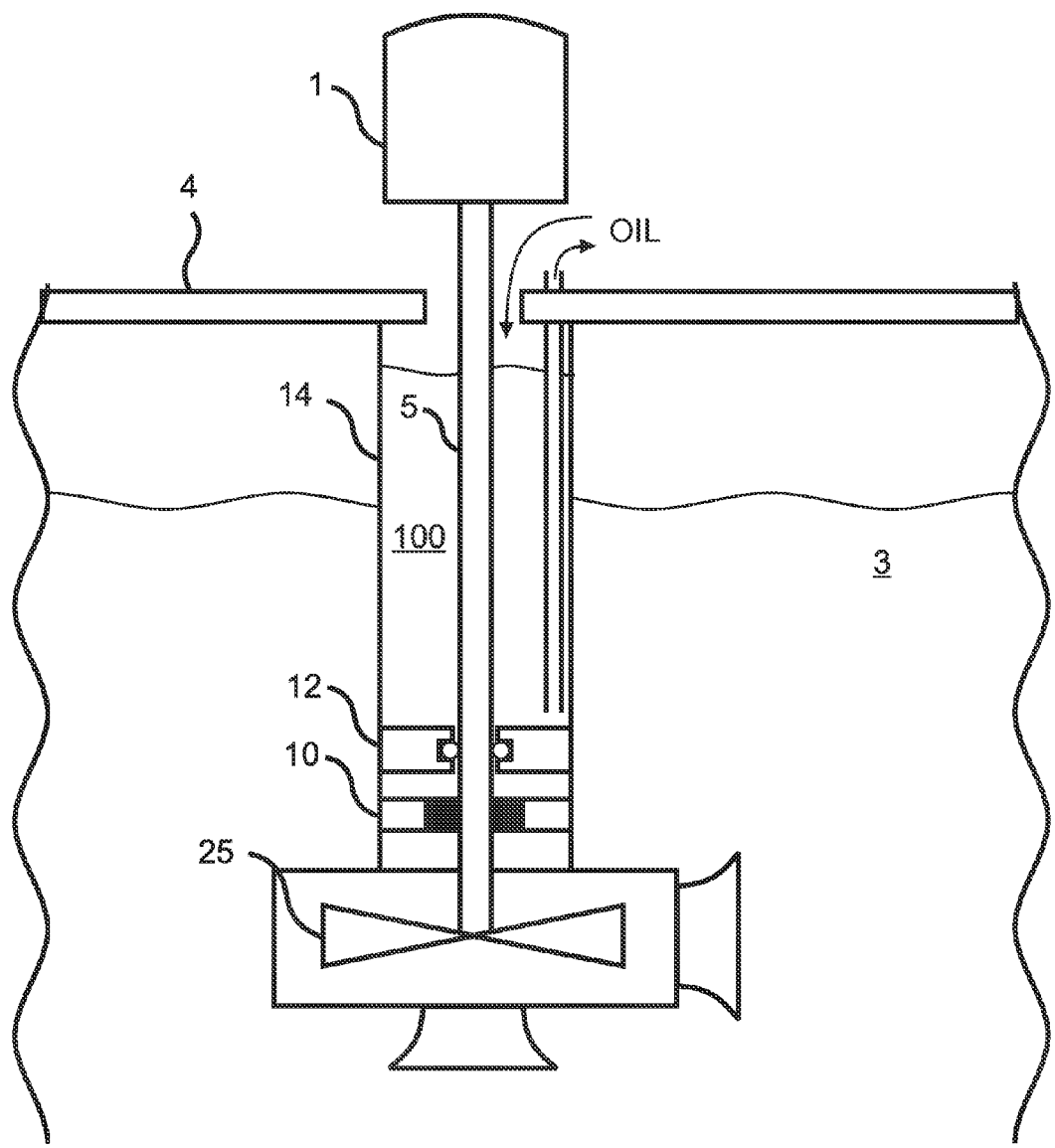
FIG. 1B is a cross-sectional side view of a typical prior art vertical, tank-mounted shaft and bearing assembly similar to the assembly of FIG. 1A, but including a lubricant circulation system.
Figure 1C:
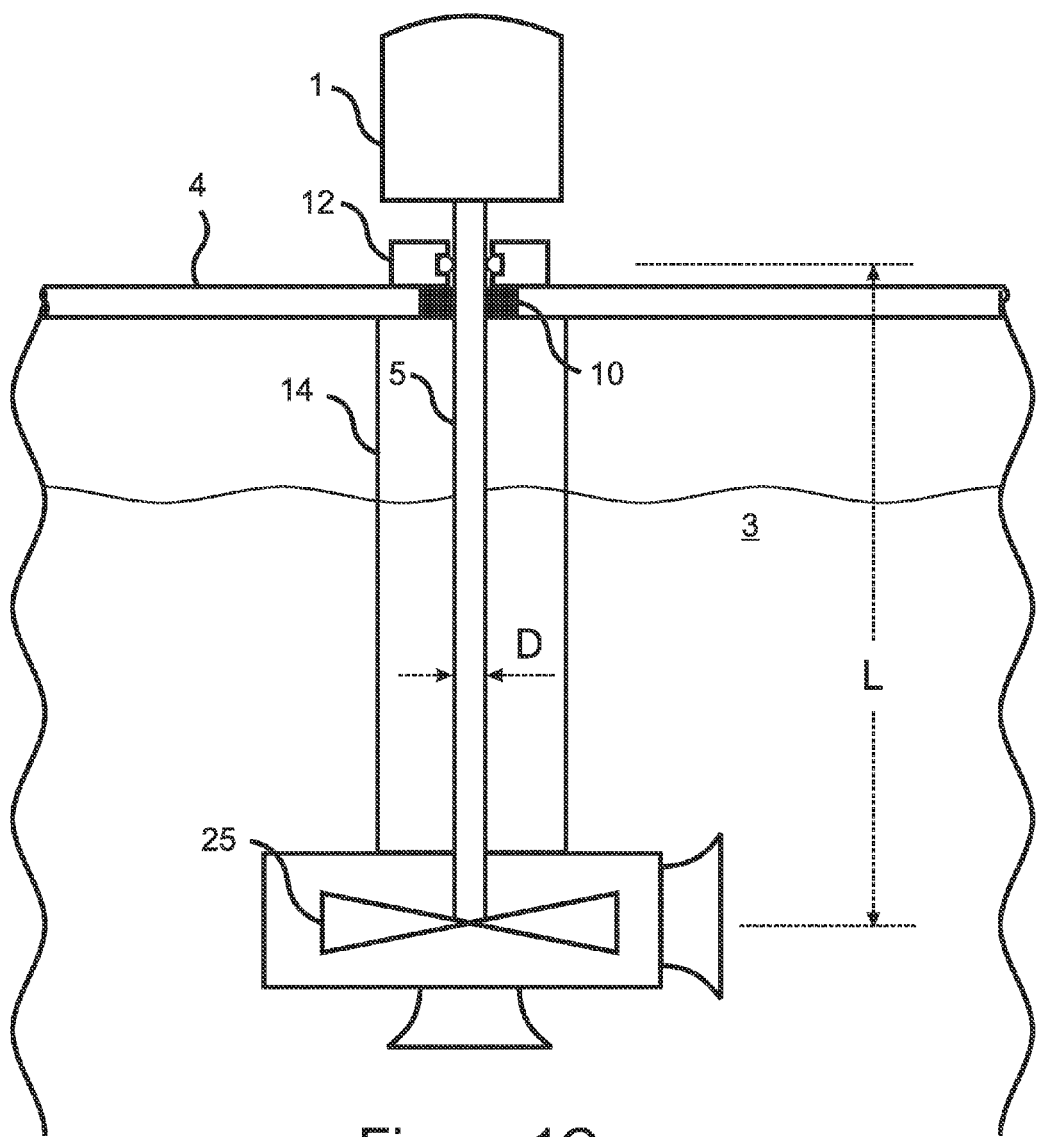
FIG. 1C is a cross-sectional side view of a typical prior art vertical, tank-mounted shaft and bearing assembly that includes only a bearing and seal located outside of the process tank, and an impeller supported by a cantilevered shaft.
Figure 2:
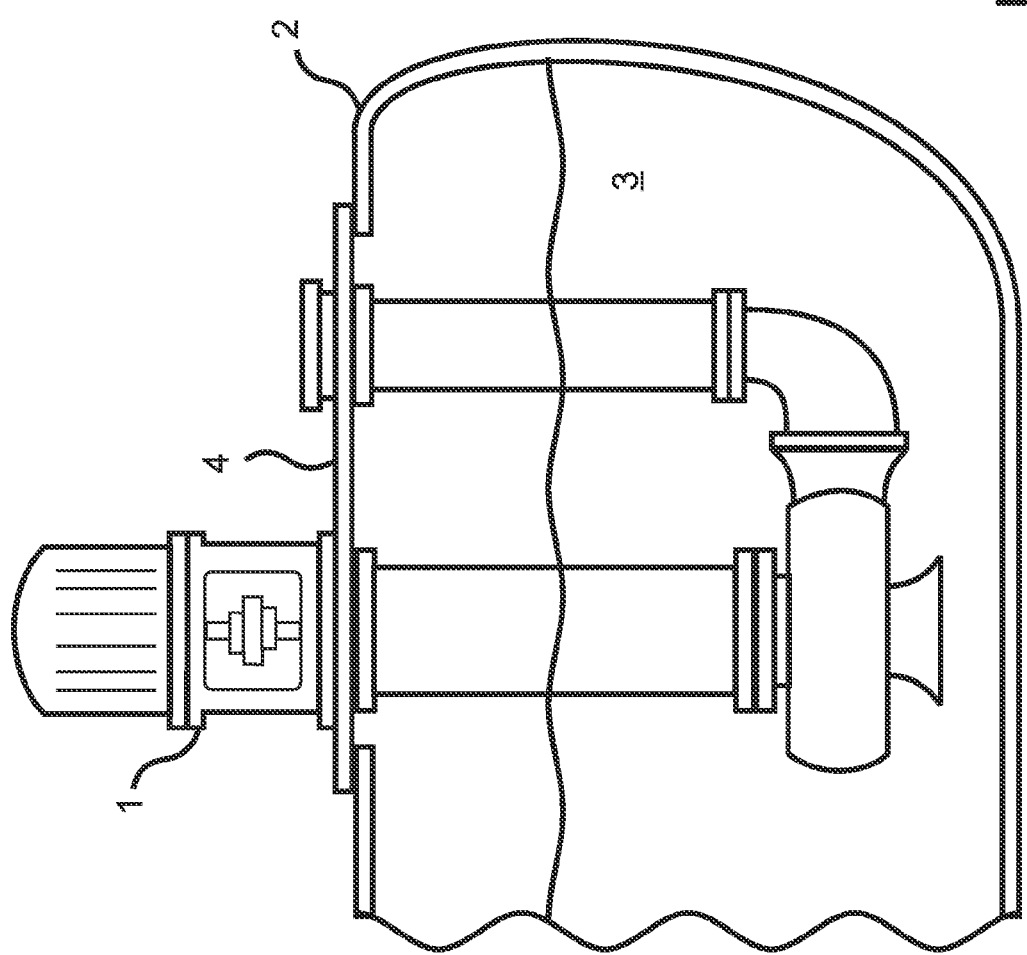
FIG. 2 is a side view of an embodiment of the present invention showing a pump assembly immersed in a process fluid at an elevated temperature exceeding 65° C.

FIG. 2 is a side view of an embodiment of the present invention, wherein a vertical pump assembly 1 is insertably mounted into a tank 2 containing a process fluid 3, such that the vertical pump assembly 1 is partially immersed in the process fluid 3. A pump cover plate 4 forms a seal with the top of the tank 2 by a means of a gasket, o-ring, or other standard means of flexible static seal (not shown) known in the art. A portion of the pump assembly 1 is exposed to the atmosphere external to the tank.

Figure 3:
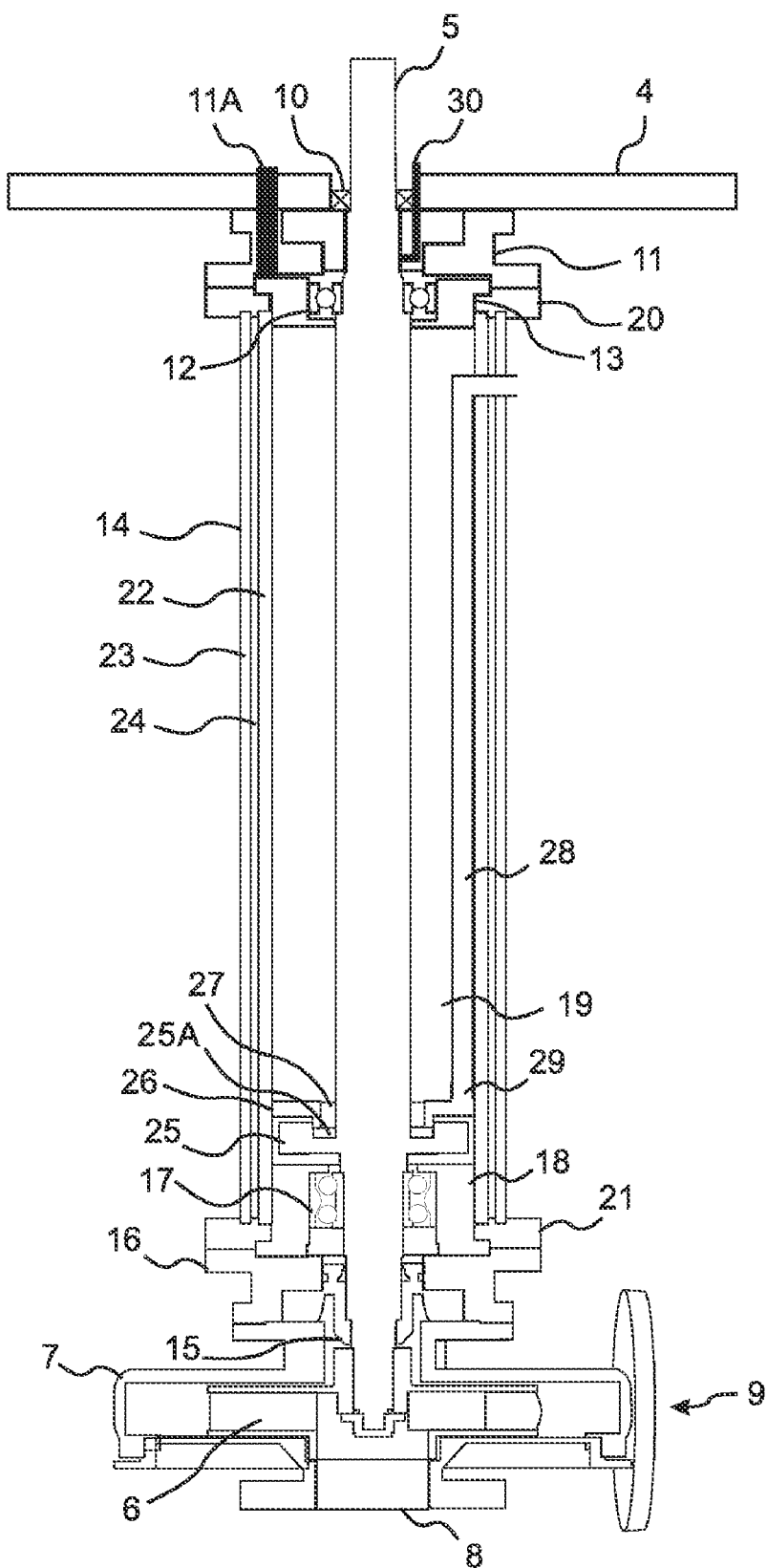
FIG. 3 is a detailed cross-sectional diagram of the embodiment of FIG. 2.

FIG. 3 is a detailed cross sectional view of the embodiment of FIG. 2. A rotatable shaft 5 extends vertically downward from a location in contact with the atmosphere external to the tank. An impeller 6 is fixedly mounted on the (lower) distal end of the shaft 5 and suspended within a pump casing 7 which channels pumped process fluid from a pump inlet 8 to a pump outlet 9.

An upper mechanical seal 10 is coaxially mounted to the shaft 5 and coaxially aligned with a seal housing 11 which is affixed to the cover plate 4. Upper bearing 12 is a commercially available rolling element bearing coaxially mounted to the shaft 5 by a suitable attachment means, and coaxially mounted into the bearing support 13 with a non-interference fit. A jacketed shaft and bearing housing 14 is sealably mounted by its upper flange 20 to the seal housing 11, and is coaxial with both the seal housing 11 and the bearing support 13, the assembly of the seal housing 11 and the jacketed shaft and bearing housing 14 thereby sandwiching and centering the bearing support 13 within the assembled upper joint.

A lower mechanical seal 15 is coaxially mounted to the shaft 5 and to a lower seal housing 16, which is affixed to the pump casing 7. The lower bearing 17 is a commercially available rolling element bearing coaxially mounted to the shaft 5 with a suitable attachment means, and coaxially mounted into a bearing support 18 with a non-interference fit. The jacketed shaft and bearing housing 14 is sealably mounted by its lower flange 21 to the seal housing 16 and is coaxial with both the seal housing 16 and the bearing support 18, the assembly of the seal housing 16 and the jacketed bearing housing 14 thereby sandwiching and centering the bearing support 18 within the assembled lower joint. The assembly of the shaft 5 with the mechanical seals 10, 15, the seal housings 11, 16, and the jacketed shaft and bearing housing 14 creates a sealed reservoir 19. A seal connection 11a is provided for supplying air or nitrogen between the gas seal 11 and the upper bearing 12.

The jacketed shaft and bearing housing 14 includes an upper flange 20, a lower flange 21, an inner column 22, and an outer jacket 23. The outer jacket 23 has a larger diameter than the inner column 22, and is smaller in diameter than the upper flange 20 and the lower flange 21. In the embodiment of FIG. 3 all of these parts are concentrically aligned and joined by welding or by some other permanent joining means known in the art, such that an annulus 24 is formed between the inner column 22 and the outer jacket 23. In some embodiments, this annulus 24 is evacuated by way of a temporary connection (not shown) that is then sealed so as to create a permanent vacuum. It is well known to those familiar with the art of heat transfer that vacuum jackets are an effective means for inhibiting conductive heat transfer through a chamber wall separating media of disparate temperatures. In other embodiments the annulus 24 is filled with air or nitrogen, and/or with an insulating foam or other insulating material such as glass wool.

A lubricant circulating impeller 25 is coaxially and fixedly mounted to the shaft 5 near its distal end, the lubricant circulating impeller 25 being inboard of, and adjacent to, the lower bearing support 18 and lower bearing 17. In similar embodiments, the circulating impeller 25 is attached to the shaft 5 at other locations. For example, in some of these embodiments, the circulating impeller is located between the lower bearing 17 and the lower seal 15.

A circulator inlet plate 26 is coaxially and fixedly mounted to the inner column 22. A concentric inlet hole 27 has a larger diameter than the shaft 5, such that an annulus is formed between the circulator inlet plate 26 and the shaft 5. A circulator impeller inlet 25A is upward facing and adjacent to the concentric inlet hole 27. A circulator outlet conduit 28 is fixedly connected to a discharge port 29 which is adjacent to the outside diameter of the circulator inlet plate 26 and extends to the inlet (not shown) of a cooler mounted externally to the tank 2. A return conduit connects the outlet of the externally mounted cooler (not shown) to a return passage 30. In the embodiment of FIG. 3, the circulator outlet conduit 28 passes through a penetration in the jacketed bearing frame 14 which is sealed by welding or by other means. In other embodiments, the circulator outlet conduit 28 is routed through other components.

Mechanical seals are commercially available components that are well known to those skilled in the art of designing rotating equipment. They typically use gaskets and o-rings in combination with mating rotating and stationary seal faces so as to prevent leakage along a rotating shaft from one chamber to another, or from one chamber to atmosphere. In the embodiment of FIG. 3, one of the mechanical seals 10 prevents leakage from the jacketed bearing and shaft housing 14 to the atmosphere, while the other mechanical seal 15 prevents leakage from the pumped process fluid 3 to the jacketed bearing and shaft housing 14. The reservoir 19 is filled during operation with a lubricating oil to a level which is above the circulator inlet plate 26 and below the bearing support 13. Air or nitrogen is injected through a connection 11A so as to pressurize the reservoir 19 and its associated lubrication system to a pressure which is higher than the process pressure, thereby preventing any leakage of process fluid 3 and of any associated solids across the faces of the seal 15 into the reservoir 19.

Rotation of shaft 5 causes lubricant in reservoir 19 to be drawn downward through the annulus formed by circulator inlet plate 26 and shaft 5 and into circulator impeller inlet 25A, whereupon it is accelerated by the centrifugal action of circulating impeller 25 and discharged through conduit 28 to an externally mounted cooler (not shown). The cooled lubricant then returns through return passage 30, where it is directed onto and lubricates upper bearing 12 before returning to the reservoir 19. The lower bearing 17 and lower mechanical seal 15 are lubricated by immersion in the lubricant reservoir 19. The process fluid 3 is at a higher temperature than the lubricating oil in the reservoir 19, and is in intimate contact with the partially submerged vertical tank mounted pump assembly 1, but is inhibited from conductively transferring heat into the lubricating oil within the reservoir 19 by the vacuum in the annulus 24 of the shaft and bearing housing 14.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A vertically mountable shaft and bearing assembly for imparting rotary motion to a rotatable device submerged in a process fluid at a high temperature, the assembly comprising:
    a shaft having a proximal end to which rotation can be imparted, and a distal end which is attached to the rotatable device;
    a lower mechanical bearing rotatably supporting the shaft near its distal end;
    a shaft housing which contains the lower mechanical bearing and at least a portion of the shaft proximal to the lower mechanical bearing, the shaft housing including a layer of thermal insulation proximal to an inward-facing surface of the shaft housing which is capable of inhibiting conduction of heat from process fluid surrounding an exterior of the shaft housing into an interior of the shaft housing, the thermal insulation including at least one of vacuum, air, nitrogen, insulating foam, and glass wool, the interior of the shaft housing being a reservoir which is able to contain a lubricant that lubricates the lower mechanical bearing; and
    a lower mechanical seal allowing the distal end of the shaft to rotatably extend beyond a distal end of the shaft housing while preventing entry by the process fluid into the interior of the shaft housing when the distal end of the shaft housing is submerged in the process fluid.

2. The assembly of claim 1, wherein the thermal insulation is enclosed in a space between inner and outer walls of the shaft housing.

3. The assembly of claim 1, wherein the thermal insulation includes a layer of thermally insulating material within and distinct from an exterior shell of the shaft housing.

4. The assembly of claim 1, wherein the lubrication reservoir can be filled with lubricant to a level higher than a level of surrounding process fluid when the distal end of the shaft housing is submerged in the process fluid.

5. The assembly of claim 1, further comprising a lubricant circulation system that can deliver lubricant to the lower mechanical bearing and then remove it therefrom.

6. The assembly of claim 5, further comprising a lubricant cooler that can cool the lubricant after it is removed from the lower mechanical bearing and before it is returned thereto.

7. The assembly of claim 5, wherein the lubricant circulation system is actuated by rotation of the shaft.

8. The assembly of claim 7, wherein the lubricant circulation system includes an impeller attached to the shaft and submerged within a lubrication reservoir formed by the shaft housing and the lower mechanical seal.

9. The assembly of claim 1, further comprising an upper mechanical bearing supporting the shaft near its proximal end.

10. The assembly of claim 9, further comprising an upper mechanical seal isolating the interior of the shaft housing from a surrounding environment.

11. The assembly of claim 10, wherein the upper mechanical seal is lubricated by a gas.

12. The assembly of claim 9, further comprising a lubricant circulation system that can deliver lubricant to the upper mechanical bearing and to the lower mechanical bearing, and remove it therefrom.

13. The assembly of claim 9, wherein the upper mechanical seal includes a plurality of seals.

14. The assembly of claim 9, wherein the upper mechanical bearing is an oil-lubricated, roller element bearing.

15. The assembly of claim 9, further comprising at least one intermediate bearing supporting the shaft at a location between the lower mechanical bearing and the upper mechanical bearing, each of the intermediate bearings being one of a journal bearing and a roller element bearing.

16. The assembly of claim 9, wherein the interior of the shaft housing is pressurizable by a gas to a pressure greater than a pressure of process fluid adjacent to the lower mechanical seal when the distal end of the shaft housing is submerged in the process fluid.

17. The assembly of claim 1, wherein the lower mechanical seal includes a plurality of seals.

18. The assembly of claim 1, wherein the lower mechanical bearing is an oil-lubricated, roller element bearing.

19. The assembly of claim 1, wherein the shaft has an $L^3/D^4$ of less than 50 in$^{-1}$.

20. The assembly of claim 1, wherein the rotatable device is an impeller included in a fluid pump.

21. The assembly of claim 1, wherein the shaft housing supports a housing of a fluid pump.

22. A vertically mountable shaft and bearing assembly for imparting rotary motion to a rotatable device submerged in a process fluid at high temperature, the assembly comprising:
- a shaft having a proximal end to which rotation can be imparted, and a distal end which is attached to the rotatable device;
- an upper mechanical bearing supporting the shaft near its proximal end;
- a lower mechanical bearing supporting the shaft near its distal end;
- a shaft housing which contains the lower mechanical bearing and a portion of the shaft proximal to the lower mechanical bearing, the shaft housing including a layer of thermal insulation proximal to an inward-facing surface of the shaft housing which is capable of inhibiting conduction of heat from process fluid surrounding an exterior of the shaft housing into an interior of the shaft housing, the thermal insulation including at least one of vacuum, air, nitrogen, insulating foam, and glass wool, the interior of the shaft housing being a reservoir which is able to contain a lubricant that lubricates the lower mechanical bearing;
- an upper seal that allows the proximal end of the shaft to rotatably extend beyond a proximal end of the shaft housing while isolating the shaft housing interior from a surrounding environment;
- a lower mechanical seal that allows the distal end of the shaft to rotatably extend beyond a distal end of the shaft housing while preventing entry of process fluid into the interior of the shaft housing when the distal end of the shaft housing is submerged in the process fluid; and
- a lubricant circulation system which is capable of circulating lubricant between the upper mechanical bearing, the lubricant reservoir within the shaft housing interior, the lower mechanical bearing, and a lubricant cooler external to the shaft housing.

* * * * *